United States Patent [19]

Chapman et al.

[11] 4,113,708
[45] Sep. 12, 1978

[54] MELT PREPARATION OF 6TA/6IA POLYMERS WITH PHOSPHORUS COMPOUND TO REDUCE AMMONIA FORMATION

[75] Inventors: Richard D. Chapman; Donald A. Holmer; George A. Mortimer, all of Pensacola, Fla.

[73] Assignee: Monsanto Company, St. Louis, Mo.

[21] Appl. No.: 759,313

[22] Filed: Jan. 14, 1977

[51] Int. Cl.$^2$ ............................................. C08G 69/28
[52] U.S. Cl. ..................................... 528/313; 528/338; 528/339; 528/324; 528/336
[58] Field of Search ................... 260/78 R, 78 A, 78 L

[56] References Cited

U.S. PATENT DOCUMENTS

| 3,365,428 | 1/1968 | Wujciak | 260/78 R |
| 3,825,508 | 7/1974 | Ashida et al. | 260/78 R |
| 3,941,755 | 3/1976 | Chapman et al. | 260/78 R |

OTHER PUBLICATIONS

Organophosphorus Monomers & Polymers – E. L. Gefter, 1962, pp. X–XIII.

Primary Examiner—Harold D. Anderson
Attorney, Agent, or Firm—John W. Whisler

[57] ABSTRACT

An improvement in the process for preparing random copolyamides by the melt polymerization of a mixture of hexamethylenediammonium terephthalate and hexamethylenediammonium isophthalate is described. The improvement comprises accomplishing the melt polymerization in the presence of a small amount of a certain phosphorus compound, such as benzene phosphinic acid, whereby ammonia formation during polymerization is reduced.

8 Claims, No Drawings

MELT PREPARATION OF 6TA/6IA POLYMERS WITH PHOSPHORUS COMPOUND TO REDUCE AMMONIA FORMATION

BACKGROUND OF THE INVENTION

A. Field of the Invention

The invention relates to an improvement in the process for preparing fiber-forming, random copolymers comprising recurring units of the formula

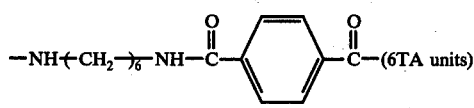

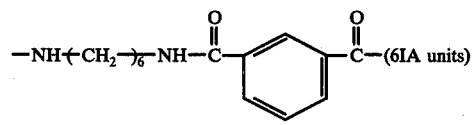

in a mole ratio of 30:70 to 80:20 by the melt polymerization of a mixture of monomers comprising at least 85 mole % hexamethylenediammonium terephthalate (6TA salt) and hexamethylenediammonium isophthalate (6IA salt), whereby the amount of ammonia formed during polymerization is reduced.

As used herein the term 6TA/6IA copolymer refers to the above copolymer consisting essentially of 6TA/6IA units.

B. Description of the Prior Art

It is generally known in the art that 6TA/6IA copolymers may be prepared in a conventional manner by the melt polymerization of a mixture of 6TA and 6IA salts such as by the procedures described in British Pat. No. 1,382,551, U.S. Pat. No. 3,941,755. It is a common practice to use as the starting material for the melt polymerization an aqueous solution of the 6TA and 6IA salts. The salts are made by mixing stoichiometric amounts of hexamethyleendiamine (HMD), terephthalic acid (TA) and isophthalic acid (IA) in water. In principle, the conversion of the salts to 6TA/6IA copolymer involves heating the salts to a temperature at which condensation of —NH$_2$ and —COOH groups occurs, releasing water and forming

linkages. In practice, the aqueous salt solution is first concentrated to, for example, 60% and then charged to an autoclave. After purging air from the autoclave the contents of the autoclave are heated to about 220° C. while the pressure in the autoclave is permitted to rise slowly until it reaches about 250 psig, at which point steam is slowly bled off so as to maintain this pressure. The contents are then heated to about 300° C. or higher and held at this temperature for a period of time while holding the pressure substantially constant at about 250 psig by bleeding off steam. Then, the temperature is increased slightly, for example 10° to 30° C., while the pressure is reduced to atmospheric pressure. The resulting molten mass may be held at atmospheric pressure at or above the melting temperature thereof (e.g. 325° C.) for a period of time sufficient to permit escape of entrained water vapor, for example, 30 to 60 minutes. The optimum time, temperature and pressures involved in the melt polymerization will vary somewhat depending on the melting point of the particular 6TA/6IA copolymer being prepared.

It has been observed that significantly larger amounts of ammonia are formed during the melt polymerization of the 6TA/6IA salt mixture than are formed during the melt polymerization of, for example, polyhexamethylene adipamide. It is believed that the reason for this is due at least in part to the higher temperatures (e.g. > 300° C.) employed during the melt polymerization of the 6TA/6IA salt mixture. The safe disposal of by-products, such as ammonia, while being desirable from the standpoint of environmental considerations, adds to the overall cost of preparing 6TA/6IA copolymers.

Accordingly, an object of the present invention is to provide an improvement in the melt polymerization process for preparing 6TA/6IA copolymers, whereby the amount of ammonia formed during polymerization is reduced.

SUMMARY OF THE INVENTION

The present invention provides an improvement in the process for preparing copolymers by the melt polymerization of a mixture of monomers of which at least 85 mole % thereof is a mixture of 6TA and 6IA salts in a mole ratio of 30:70 to 80:20, respectively, whereby a reduction in the amount of ammonia formed during polymerization is obtained. The improvement comprises accomplishing the melt polymerization in the presence of a small but effective amount of at least one phosphorus compound of the formula

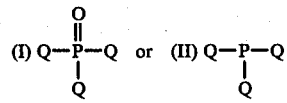

where Q is a hydrogen atom or a radical selected from the group consisting of R, OR, OM and OH, wherein R is a hydrocarbon radical, such as phenyl or a C$_1$ to C$_4$ alkyl, and M is an alkali metal atom such as Na, K, or Li, with the proviso that said each phosphorus compound has less than 2 (i.e. zero or 1) OH radicals and the phosphorus atom has a valence of less than +5, as determined by assigning a valence of (i) +1 to hydrogen atoms, (ii) −1 to R, OR, OM and OH radicals and (iii) −2 to =0 radicals. Representative such phosphorus compounds include benzene phosphinic acid, sodium hypophosphite, sodium phosphite and triphenylphosphite. If desired, a mixture of formula (I) phosphorus compounds and/or a mixture of formula (II) phosphorus compounds may be used in practicing the invention.

DETAILED DESCRIPTION OF THE PREFERRED EMBODIMENTS OF THE INVENTION

In accordance with the improvement of the present invention the amount of ammonia formed during the melt polymerization of, for example, a 6TA/6IA salt mixture is reduced by accomplishing the polymerization in the presence of a small amount of at least one phosphorus compound of the formula

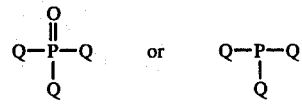

where Q has the same meaning as previously defined. Normally, a reduction in the amount of ammonia formed during polymerization is achieved when about 20 ppm or more, for example between 20 and 20,000 ppm, based on the weight of the polymer, of the phosphorus compound is present during polymerization. Generally, satisfactory results are obtained when the polymerization is accomplished in the presence of from about 50 to about 2,000 ppm, based on the weight of the final polymer, of the phosphorus compound. The phosphorus compound is conveniently added initially to the 6TA and 6IA salts or aqueous solution thereof. When the phosphorus compound is an acid, such as benzene phosphinic acid, it may be added in the form of a water soluble salt, for example, an alkali metal salt or the hexamethylene diammonium salt thereof.

The improvement of the present invention is particularly useful in accomplishing the melt polymerization of a mixture consisting of 6TA and 6IA salts in a mole of 30:70 to 80:20, respectively, or mixtures containing, in addition to said proportions of 6TA and 6IA salts, 15 mole % or less, for example 2-15 mole %, of (i) a lactam, such as caprolactam (6) or (ii) a salt of a diamine of the formula $NH_2 — R' — NH_2$ and a diacid of the formula $HOOC — R'' — COOH$, such as hexamethylenediammonium adipate (66 salt), where R' is a $C_2$ to $C_{10}$ alkylene and R'' is a $C_3$ to $C_{10}$ alkylene. Examples of such mixtures include a 60/30/10 mole % mixture of 6TA/6IA/6 or 6TA/6IA/66.

Copolymers prepared in accordance with this invention may be used to provide coatings or may be shaped into articles, such as films, molded articles and yarns by conventional techniques. For example, following the melt polymerization of a mixture (50-80/50-20 mole %) of 6TA/6IA salts, the resulting molten 6TA/6IA copolymers may be either directly spun into yarns or extruded and made into flake that is subsequently melted and spun into yarns. Preferably, when melt spinning is accomplished using flake, the flake is first dried, for example, in a vacuum oven for 12 hours at 100° C., to enhance its extrusion characteristics. The resulting as-spun 6TA/6IA yarns are essentially amorphous and may be heat treated as described in British Pat. No. 1,382,551 and U.S. Pat. No. 4,022,756 to provide dimensionally stable yarns.

The following examples are given for purposes of illustrating the invention and are not intended to in any way limit the scope of the invention. Intrinsic viscosities given in the examples were measured in 96% sulfuric acid at 25° C. and are given in units of $10 \times m^3/kg$.

EXAMPLE 1

This example illustrates the improvement of the present invention.

Eight 6TA/6IA copolymers containing 58 mole % 6TA units and 42 mole % 6IA units were prepared by the following 3 cycle melt polymerization procedure. An aqueous solution consisting of 87 grams of 6TA salt, 63 grams of 6IA salt, an antifoaming agent, from 0 to 2000 ppm, based on the weight of the resulting polymer, of benzene phosphinic acid, and 100 ml of water (deionized) was charged to a stainless steel autoclave. The exact amount of benzene phosphinic acid used in each of the eight runs is given in Table I. After thoroughly purging the autoclave contents with nitrogen, the autoclave was pressurized to 250 psig, 1.72 mega Pascals (M Pa), with nitrogen. In the first cycle the autoclave was heated to 218° ± 2° C. over a period of 32 minutes with stirring while maintaining the pressure constant at (1.72 M Pa). In the second cycle the temperature was increased to 300° C. over a period of 64 ± 5 minutes while maintaining the pressure at (1.72 M Pa). In the third cycle the pressure was reduced to atmospheric pressure over a period of 25 minutes while increasing the temperature to 325 ± 3° C. A 14-hole spinneret was then attached to the base of the autoclave and the polymer was extruded through the spinneret by application of 200 ± 35 psig (1.38 ± 0.24 M Pa) nitrogen to form a yarn. Each yarn was drawn 4.9 ± 0.3 times while passing the yarn over a heated pin (80°-90° C.) and/or through a heated furnace (140°-200° C.) to provide a drawn yarn having a denier of about 80. The amount of ammonia formed during each melt polymerization is given in the Table in terms of mole % ammonia, based on the moles of total salts used. The intrinsic viscosity of each copolymer and the tenacity of the yarn prepared therefrom are also given in Table I.

TABLE I

| Run | Benzene Phosphinic Acid, ppm | NH₃ Mole % | Yarn Tenacity g/den | Yarn Tenacity (MJ/kg) | Intrinsic Viscosity |
|---|---|---|---|---|---|
| 1 | none | 2.5 | 2.4 | 0.21 | 0.88 |
| 2 | 500  | 1.2 | 3.1 | 0.27 | 0.81 |
| 3 | 1000 | 0.9 | 3.9 | 0.34 | 0.81 |
| 4 | 1000 | 1.2 | 3.8 | 0.34 | 0.81 |
| 5 | 1000 | 1.1 | 4.2 | 0.37 | 0.82 |
| 6 | 1000 | 1.0 | 4.1 | 0.36 | 0.85 |
| 7 | 1500 | 0.9 | 4.2 | 0.37 | 0.87 |
| 8 | 2000 | 1.0 | 4.0 | 0.35 | 0.85 |

When the above melt polymerization procedure was repeated using one of the following phosphorus compounds instead of benzene phosphinic acid no significant reduction in the amount of ammonia formed during the polymerization was observed:

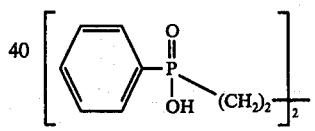

1.

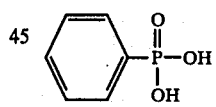

2.

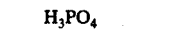

3.

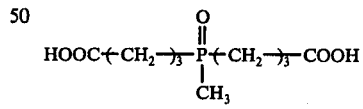

4.

EXAMPLE 2

This example demonstrates the improvement of the present invention in the melt polymerization of a mixture (59/31/10 mole %) of 6TA, 6IA salt and caprolactam.

To demonstrate the improvement two melt polymerizations were carried out, one with and one without the addition of benzene phosphinic acid to the starting material. The general procedure described in Example 1 was used with the exception that the first cycle was carried out in two parts.

In the first polymerization the following ingredients were charged to the reactor:

87.75 g of 6TA salt
47.25 g of 6IA salt
6.01 g of caprolactam
100 ml of deionized water.

The following conditions were used in the melt polymerization, where "Temp." is the temperature at the end of the cycle and "Time" is the period of time from the end of the previous cycle:

| Cycle | 1A | 1B | 2 | 3 |
|---|---|---|---|---|
| Time (min.) | 24 | 15 | 27 | 25 |
| Temp. (° C.) | 202 | 216 | 300 | 312 |
| Pressure (psig/M Pa) | 250/1.72 | 250/1.72 | 250/1.72 | 0 |

Based on the total moles of salt used in the polymerization 1.7 mole % of ammonia was formed. The intrinsic viscosity of the polymer was 0.78.

In the second polymerization benzene phosphinic acid was added to the above ingredients in an amount corresponding to 0.1% by weight, based on the weight of polymer formed (0.13 g.).

In this instance the following conditions were used in the melt polymerization:

| Cycle | 1 | 1B | 2 | 3 |
|---|---|---|---|---|
| Time (min.) | 30 | 17 | 40 | 25 |
| Temp. (° C.) | 202 | 216 | 300 | 310 |
| Pressure (psig/M Pa) | 250/1.72 | 250/1.72 | 250/1.72 | 0 |

The intrinsic viscosity of the resulting polymer was 0.78. The amount of ammonia formed during the polymerization was 1.0 mole %, based on the total moles of salt used.

EXAMPLE 3

This example demonstrates the improvement of the present invention in the melt polymerization of a mixture (56/33/11 mole %) of 6TA, 6IA and 66 salts.

To demonstrate the improvement the procedure of Example 1 was used with the exception that in this instance sodium hypophosphite (NaH$_2$PO$_2$) was employed instead of benzene phosphinic acid.

In the first polymerization the following ingredients were charged to the reactor:
77.72 g of 6TA salt
47.25 g of 6IA salt
13.94 g of 66 salt
95 ml of deionized water The following conditions were used in polymerization:

| Cycle | 1 | 2 | 3 |
|---|---|---|---|
| Time (min.) | 27 | 46 | 25 |
| Temp. (° C.) | 218 | 300 | 327 |
| Pressure (psig/M Pa) | 250/1.72 | 250/1.72 | 0 |

The intrinsic viscosity of the resulting polymer was 0.93. The amount of ammonia formed during the polymerization was 1.6 mole %, based on the total moles of salts used in the polymerization.

In the second polymerization sodium hypophosphite was added to the polymerization ingredients. The following amounts of ingredients were used:
84.0 g of 6TA salt
49.5 g of 6IA salt
15.332 g of 66 salt
0.039 g of sodium hypophosphite (0.03% by weight, based on weight of polymer)

The following conditions were used in the polymerization:

| Cycle | 1 | 2 | 3 |
|---|---|---|---|
| Time (min.) | 26 | 46 | 25 |
| Temp. (° C.) | 215 | 300 | 320 |
| Pressure (psig/M Pa) | 150/1.72 | 150/1.72 | 0 |

The intrinsic viscosity of the resulting polymer was 0.78. The amount of ammonia formed during the polymerization was 1.2 mole %, based on the total moles of salts used in the polymerization.

EXAMPLE 4

This example further demonstrates the improvement of the present invention in the melt polymerization of a mixture (58/42 mole %) of 6TA and 6IA salts.

To demonstrate the improvement six melt polymerizations were carried out using the general procedure described in Example 1. Five of the polymerizations were carried out in the presence of sodium hypophosphite and the amount thereof was varied from polymerization to polymerization. For purposes of comparison one polymerization was carried out in the absence of sodium hypophosphite.

The following ingredients were charged to the reactor:
87.00 g of 6TA salt
63.00 g of 6IA salt
sodium hypophosphite (0–10000 ppm)
50 ml of deionized water
5 drops of an antifoaming agent.

The conditions used in each of the polymerizations were as follows:

| Cycle | 1 | 2 | 3 |
|---|---|---|---|
| Time (min.) | 25 ± 2 | 31 ± 3 | 25 |
| Temp. (° C) | 223 + 5 | 300 | 224 ± 3 |
| Pressure (psig/M Pa) | 250/1.72 | 250/1.72 | 0 |

The amount of sodium hypophosphite used in each polymerization, expressed as ppm, based on the weight of salts; the amount of ammonia formed during each polymerization expressed as mole %, based on the moles of salt used; and the intrinsic viscosity of each of the resulting polymers are given in the following table:

TABLE II

| Run | Sodium hypophosphite ppm | NH$_3$ mole % | Intrinsic Viscosity |
|---|---|---|---|
| 4A | none | 2.0 | 0.83 |
| 4B | 54 | 1.5 | 0.81 |
| 4C | 100 | 1.2 | 0.89 |
| 4D | 300 | 1.2 | 0.83 |
| 4E | 1000 | 0.7 | 0.78 |
| 4F | 10100 | 0.8 | 1.02 |

EXAMPLE 5

This example demonstrates the use of triphenylphosphite in carrying out the improvement of the invention.

A melt polymerization was carried out using the same ingredients and procedure that were used in Run 4E described in Example 4 with the exception that triphenylphosphite was used instead of sodium hypophosphite. The amount of ammonia formed during the polymerization, expressed as in Example 4, and the intrinsic viscosity of the resulting polymer are given in the following table:

TABLE III

| Run | Triphenylphosphite, ppm | NH$_3$ mole % | Intrinsic Viscosity |
|---|---|---|---|
| 5A | 1000 | 0.9 | 0.79 |
| 4A (comparison) | none | 2.0 | 0.83 |

EXAMPLE 6

This example demonstrates the improvement of the present invention in the melt polymerization of a mixture (35/65 mole %) of 6TA and 6IA salts. In this example water was not present in the starting material.

To demonstrate the improvement two melt polymerizations were carried out, one without (6A) and one with (6B) the addition of sodium hypophosphite to the starting materials. The general procedure described in Example 1 was used. The materials charged to the reactor were:
52.50 g of 6TA salt
97.50 g of 6IA salt
0.75 g of Benzoic acid, as stabilizer
5 drops of an antifoaming agent
0.039 g (300 ppm, based on weight of salt) of sodium hypophosphite (6B) or none (6A)

The materials were well blended prior to being charged to the reactor. The following conditions were used in each of the melt polymerizations:

| Cycle | Run 6A/6B | | |
|---|---|---|---|
| | 1 | 2 | 3 |
| Time (min.) | 30/28 | 34/29 | 25/25 |
| Temp. (° C.) | 216/215 | 300/300 | 303/307 |
| Pressure (psig) | 250/250 | 250/250 | 0/0 |

The data and results concerning polymerizations 6A and 6B are given in the following table:

TABLE IV

| Run | NH$_3$(mole %) | Intrinsic Viscosity |
|---|---|---|
| 6A (no sodium hypophosphite) | 1.8 | 0.77 |
| 6B (300 ppm sodium hypophosphite) | 0.9 | 0.80 |

EXAMPLE 7

This example demonstrates the improvement of the present invention in the melt polymerization of a mixture (68/32 mole %) of 6TA and 6IA salts.

To demonstrate the improvement two melt polymerizations were carried out, one without (7A) and one with (7B) the addition of sodium hypophosphite to the starting materials. The general procedure described in Example 1 was used. The materials charged to the reactor were:
102.00 g of 6TA salt
48.00 g of 6IA salt
5 drops of an antifoaming agent
0.75 g of benzoic acid as a stabilizer
100 ml of deionized water
0.039 g (300 ppm, based on weight of final polymer) of sodium hypophosphite (7B) or none (7A)

The conditions used in each of the polymerization were as follows, where "Temp." is the temperature at the end of the cycle and "Time" is the period of time from the end of the previous cycle.

| Cycle | Run 7A/7B | | |
|---|---|---|---|
| | 1 | 2 | 3 |
| Time (min.) | 26/27 | 47/54 | 35/36 |
| Temp. (° C.) | 232/235 | 310/310 | 328/328 |
| Pressure (psig) | 350/350 | 350/350 | 0/0 |

Data and results concerning polymerizations 7A and 7B are given in Table V.

TABLE V

| Run | NH$_3$ (mole %) | Intrinsic Viscosity |
|---|---|---|
| 7A | 3.5 | 0.68 |
| 7B | 2.4 | 0.65 |

We claim:
1. In a process for preparing a random copolyamide by melt polymerization of a mixture consisting essentially of (i) hexamethylenediammonium terephthalate and (ii) hexamethylenediammonium isophthalate in a mole ratio of 30:70 to 80:20, respectively, and (iii) from 0 to 15 mole %, based on the moles of (i) and (ii), of a lactam or salt of a diamine of the formula NH$_2$— R' — NH$_2$ and a diacid of the formula HOOC — R" — COOH, where R' is a C$_2$ to C$_{10}$ alkylene and R" is a C$_3$ to C$_{10}$ alkylene, the improvement comprising adding to said mixture prior to melt polymerization thereof from 20 to 20,000 parts per million, based on the weight of said copolymer, of at least one phosphorus compound whereby the amount of ammonia formed during melt polymerization is reduced, said phosphorus compound or compounds being of the formula

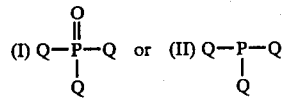

where Q is a hydrogen atom or a radical selected from the group consisting of R, OR, OM and OH wherein R is a hydrocarbon radical and M is an alkali metal atom, with the proviso that each said phosphorus compound has no more than one OH radical and in formula (I) at least one of the Q's is hydrogen.

2. The process of claim 1 wherein said mixture contains between 2 and 15 mole % of hexamethylenediammonium adipate.

3. The process of claim 1 wherein said mixture contains between 2 and 15 mole % of caprolactam.

4. The process of claim 1 wherein said mixture consists essentially of (i) and (ii).

5. The process of claim 1 wherein said phosphorus compound is benzene phosphinic acid or the hexamethylene diammonium thereof.

6. The process of claim 1 wherein said phosphorus compound is sodium hypophosphite.

7. The process of claim 1 wherein said phosphorus compound is triphenylphosphite.

8. The process of claim 1 wherein a mixture of said phosphorus compounds is used.

* * * * *